United States Patent [19]

Luthra

[11] 4,049,768
[45] Sept. 20, 1977

[54] METHOD FOR EXTENDING THERMOPLASTIC FOAMS HAVING SMOOTH EXTERNAL SKINS

[75] Inventor: Vinod K. Luthra, East Rochester, N.Y.

[73] Assignee: Mobil Oil Corporation, New York, N.Y.

[21] Appl. No.: 675,384

[22] Filed: Apr. 9, 1976

[51] Int. Cl.² .......................... B29D 7/24; B29D 27/00
[52] U.S. Cl. .................................. 264/45.5; 264/45.9; 264/209; 264/237; 264/DIG. 14; 425/72 R; 425/817 C
[58] Field of Search .................. 264/48, 51, DIG. 14, 264/95, 45.5, 45.9, 146, 209, 237; 425/72 R, 326 R, 387 R, 72 R, 817 C

[56] References Cited

U.S. PATENT DOCUMENTS

| | | | |
|---|---|---|---|
| 2,461,630 | 2/1949 | Cozzo | 264/DIG. 14 |
| 2,668,323 | 2/1954 | Johnson | 425/72R |
| 3,088,167 | 5/1963 | Corbett | 425/326 R X |
| 3,413,387 | 11/1968 | Ohsol | 264/53 X |
| 3,426,113 | 2/1969 | Yazawa | 264/95 |
| 3,560,600 | 2/1971 | Gliniecki | 264/48 |
| 3,835,209 | 9/1974 | Karabedian | 264/95 X |
| 3,871,802 | 3/1975 | Blackwelder | 264/48 X |
| 3,976,411 | 8/1976 | Rahlfs et al. | 425/72 R |

FOREIGN PATENT DOCUMENTS 1,017,398  1/1966  United Kingdom ............ 425/326 R

*Primary Examiner*—Philip Anderson
*Attorney, Agent, or Firm*—Charles A. Huggett; James D. Tierney

[57] ABSTRACT

A method and apparatus are provided for employment in thermoplastic foam extrusion utilizing a direct-injection extrusion process. Thermoplastic foam material is produced which is characterized by having relatively smooth external skin surfaces, and an internal cellular structure, by providing intensive cooling of the foam material immediately upon its issuance from an extrusion die orifice. Means are also provided for controlling the cooling rate utilizing an adjustable device which controls the rate of cooling air flow and air temperature within the extended foam tube.

1 Claim, 5 Drawing Figures

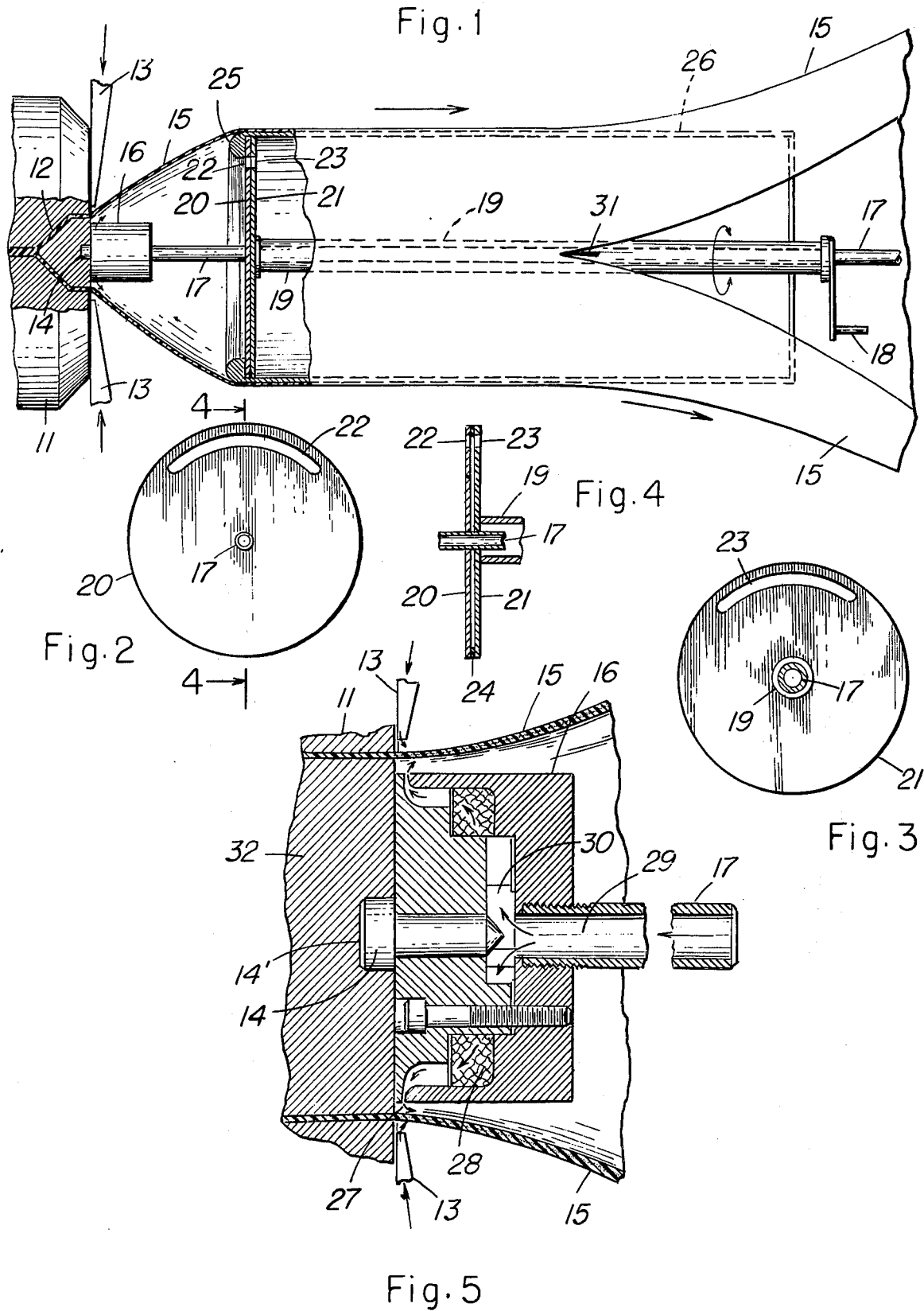

METHOD FOR EXTENDING THERMOPLASTIC FOAMS HAVING SMOOTH EXTERNAL SKINS

BACKGROUND OF THE INVENTION

1. Field of the Invention

The present invention relates to a method for the treatment of extruded thermoplastic foam material such as polystyrene foam whereby the resultant foam product is characterized by having smooth external skin surfaces which facilitates printing such surfaces with advertising indicia and which lends an aesthetic appeal to the appearance of products fabricated from such foam.

2. Description of the Prior Art

U.S. Pat. No. 3,560,600 discloses a method for the surface treatment of extruded plastic foam whereby such foams are internally and externally air cooled immediately upon their emergence from a die orifice. The method and apparatus disclosed in that patent, however, does not suggest a convenient way for exhausting cooling air from the interior of the extruded foam tube but rather teaches that complicated structural modifications must be made to the extrusion die apparatus to effect requisite air exhaust. Additionally, the patent suggests employment of an internal air nozzle to cool the interior surface of the tubular foam as it issues from the die. However, such cooling as disclosed in the patent is extremely inefficient. The mandrel portion of the die surface, rather than the interior surface of the foam, is exposed to the major portion of the coolant.

SUMMARY OF THE INVENTION

It has been found that when foam articles are fabricated from foam material manufactured as hereinabove described, they may be imprinted with advertising indicia and the like. However, the print registration and clarity of the print design is not satisfactory due to the discontinuous nature of the foam surface caused by, for example, individual ruptured cells on the exterior surface of the foam. In order to remedy this and improve the print receptivity characteristics of the foam surface, it has been found desirable to positively cool the exterior surface of the foam material immediately upon its emergence from the die orifice. This surface cooling results in a retardation of cell formation in the surface of the foam while at the same time allowing foaming action to proceed normally interiorly of the foam layer. The resultant foam product is characterized by having a continuous surface which is characterized by a low percentage of ruptured cells, as contrasted to the hereinabove described foam material which was not positively cooled upon its emergence from the die orifice.

The present invention provides a method for improving the surface characteristics of extruded thermoplastic foam material comprising employment of an internal fluid-cooling nozzle positioned interiorly of the extruded tube and adjacent the annular extrusion orifice from which the tube is being extruded. Simultaneously, an external fluid cooling ring which encircles the tube as it is extruded cools the exterior surface thereof. The tube is subsequently drawn over the cooled surface of a cylindrical forming drum. The face of the forming drum is provided with an air vent having adjustable baffle means for controlling the exhaust of air from the cooling air nozzle thereby providing positive means for control of the internal fluid cooling of the extruded foam tube.

BRIEF DESCRIPTION OF THE DRAWINGS

FIG. 1 is a schematic, side elevation view, partly in cross-section, of one form of the foam cooling and control apparatus of the present invention.

FIG. 2 is a plan view taken on line 2—2 of FIG. 1.

FIG. 3 is a plan view taken on line 3—3 of FIG. 1.

FIG. 4 is an enlarged cross-sectional view of an air-baffle arrangement shown in FIG. 1.

FIG. 5 is a schematic, cross-sectional view of the air nozzle means shown in FIG. 1, and an enlarged fragmentary cross-sectional portion of a tubular extrusion die.

DESCRIPTION OF SPECIFIC EMBODIMENTS

In recent years, the employment of polystyrene foam materials to produce thermoformed articles, such as egg cartons, meat trays and the like, for packaging applications as well as other varied end use applications has become widespread. It is often times desirable for such articles to be imprinted with advertising indicia, decorations, legends and the like. In order to achieve high print quality including precise registration of the imprinted design, it has been found desirable to insure that there are a minimum of ruptured cells on the foam surface to be imprinted and, further, to have an integral, continuous, unfoam skin-like layer on the foam surface to be imprinted.

In general, techniques for the extrusion of polystyrene foam are described in the prior art such as, for example, U.S. Pat. No. 3,482,006, the disclosure of which is incorporated herein by reference. Polystyrene resin pellets are fed into the feed hopper of a standard rotating screw type thermoplastic extruder. The polystyrene resin pellets are admixed with additive materials which are employed to control the final cell size of the foam product. Such cell size control additives may include mixtures of sodium bicarbonate and citric acid, finely divided silica, clays, and the like. After the resin — additive mixture is advanced and melted in the extruder a volatile blowing agent such as pentane or isopentane is injected into the molten resinous mass and admixed therewith. Finally, this mixture is extruded through a die orifice, preferably a circular orifice, whereby a hollow foam tube is produced. Upon emergence from the die orifice, the foam tube is expanded and drawn onto and over the surface of a cylindrical drum which helps to shape the tube and cool it, the drum surface being cooled by internally circulating coolant fluids therein.

As more particularly shown in FIG. 1, which schematically represents a portion of an extrusion and forming line incorporating the novel cooling arrangement of the present invention, thermoplastic material such as polystyrene foam may be extruded through annular extrusion orifice 12 to form tubular foam member 15 which begins to foam immediately upon exit from the annular orifice 12 of die member 11. As shown in FIGS. 1 and 5 there is an external conventional air ring 13 which surrounds the extruded tube 15 as it emerges from the die orifice and immediately begins cooling the extruded surface of foam 15 to retard foaming action on that surface while the internal portion of the layer foams and forms individual foam cells. Tubular foam member 15 is next drawn over the surface of cylindrical drum member 26 which forms, and additionally cools, the foam tube. The cooling action is achieved on the drum surface by the circulation of cooling fluids (not shown) in the internal surface of drum 26. As foam tube 15 is drawn along the surface of drum 26, it is eventually slit by slitter knives 31 positioned on opposite sides of drum 26. Subsequently, the slit, individual foam sheets are passed to further processing or, alternatively, to a wind-up operation.

As also shown in FIG. 1, and in greater detail in FIG. 5, and internal fluid cooling nozzle 16 is positioned interiorly of the foam tube as it emerges from die member 11. Nozzle 16 is positively positioned by having an externally centrally located probe 14 aligned with and inserted into matching engagement with recess 14 located centrally on the face of annular die 32. Hence, nozzle 16 will always be positively centrally positioned with respect to the die and the foam material 15 issuing from the die orifice. Radial orifice 27 which surrounds nozzle 16 supplies cooling air under pressure to the internal surface of foam layer 15 immediately upon its emergence from die orifice 12 as more clearly shown in FIG. 5. The direction of the cooling air from orifice 27 is substantially perpendicular to the interior surface of tubular foam element 15 whereby all of the cooling from nozzle 16 is directed at the interior surface of the foam 15.

Supply coolants for nozzle 16 may be selected from a variety of gaseous media and particularly air is a preferred coolant. Preferably, the air may be chilled by conventional refrigeration exchange means (not shown) and is subsequently fed to supply line 17 and through supply line 17 to nozzle 16. The coolant air from supply line 17 enters nozzle 16, as shown in FIG. 5, through passage 29 and is distributed through plenum 30 into chamber 28, which contains baffling material such as copper gauze or polyurethane open cell foam and the like materials to act as a baffle for diffusing the air prior to its exit from orifice 27 of cooling nozzle 16. The orifice gap 27 of nozzle 16 may have an aperture of from about 7 mil. to about 20 mil. and preferably from about 10 mil. to about 15 mil. It is preferred that relatively high velocity air, i.e. on the order of from about 600 ft/min. to about 1,000 ft/min. to be forced through orifice 27 to effect sudden and rapid cooling of the interior surface of foam tube 15. The preferred distance intermediate the interior foam surface and orifice gap 27 is about ¼ inches, but may vary from about 0 to about 1 inches.

It will be noted that the face of forming drum 26 has a protruding lip 25 surrounding its periphery to facilitate passage of the foam tube to and over the surface of drum 26. The face 20 of drum 26, as shown in FIG. 2, is provided with a radial aperture 22. In accordance with one aspect of the present ivention radial aperture 22 is employed to exhaust the cooling air supplied by nozzle 16 out of the interior of the space defined by the die face, the conical portion of tube 15, and the drum face 20.

For precise control of the rate of exhaust of the cooling air from drum face 20, radial aperture 22 is baffled with an adjustable baffle plate 21 mounted immediately behind drum face 20 as shown in FIG. 1. Baffle plate 21 is provided with a radial aperture 23 which when in alignment with radial aperture 22 will allow for maximum flow or exhaust of cooling air from the interior of the tube. It will be noted that baffle plate 21 is mounted on a rotatable vent control arm 19, handle 18 being affixed to vent control arm 19 to adjust movement of baffle plate 21 with respect to drum face 20.

It will be obvious that as aperture 23 of rotatable baffle plate 21 is moved out of alignment with aperture 22 is drum face 20, the amount of air which is exhausted from the interior of the tube will be decreased proportionately, baffle plate 21 gradually obstructing radial orifice 22 as radial orifice 23 is turned out of alignment therewith. The periphery of aperture 23 of rotatable baffle plate 21 is lined with a sufficient amount of rubber gasket material so as to minimize air leaks and thereby making the control of air through this baffle plate arrangement more effective.

FIG. 4 which is a vertical cross-section through drum face member 20 and baffle element 21, when they are in operative engagement, shows that they are separated by rubber gasketing material 24 to facilitate the turning movement of baffle member 21 against the downstream surface of fixed drum face 20, and present leakage of air. The commercially available rubber gasketing material of nominal thickness, e.g., ⅛ inches, and width, from about ⅛ inches to about ¼ inches has been found to be adequate.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. In a method for the surface treatment of extruded tubular thermoplastic foams wherein an internal nozzle and an external cooling ring are employed to cool the foam surface and form continuous skin layers thereon and wherein the foam tube subsequent to forming is drawn over the cylindrical surface of a forming drum, the improvement which comprises providing and utilizing an air vent in the face portion of said forming, drum said air vent comprising an orifice having an adjustable baffle whereby the return flow of cooling air from the interior of the extruded tube is controlled resulting in alterations in the characteristics of said skin layers.

* * * * *